(12) United States Patent
Moser et al.

(10) Patent No.: US 7,047,690 B2
(45) Date of Patent: May 23, 2006

(54) AGRONOMIC METHOD FOR COMMERCIAL PRODUCTION OF THE GREEN CICER BEAN

(75) Inventors: T. Douglas Moser, Genesee, ID (US); Shane C. Moser, Genesee, ID (US); Foster C. Cronyn, Eagle, ID (US)

(73) Assignee: TD Moser Farms, L.L.C., Genesee, ID (US)

( * ) Notice: Subject to any disclaimer, the term of this patent is extended or adjusted under 35 U.S.C. 154(b) by 0 days.

(21) Appl. No.: 10/713,553

(22) Filed: Nov. 14, 2003

(65) Prior Publication Data

US 2005/0102896 A1   May 19, 2005

(51) Int. Cl.
*A01G 1/00* (2006.01)
*A01D 91/00* (2006.01)

(52) U.S. Cl. .................. 47/58.1 SC; 47/58.1 FV; 56/1

(58) Field of Classification Search ............. 47/58.1 R, 47/58.1 SC, 58.1 FV, 58.1 SE; 56/1
See application file for complete search history.

(56) References Cited

U.S. PATENT DOCUMENTS

2005/0102991 A1* 5/2005 Moser .................. 56/327.1
2005/0106298 A1* 5/2005 Moser et al. ............. 426/481

OTHER PUBLICATIONS

Brick et al. 1998. Garbanzo Bean Production Trials in Colorado and Wyoming. TB 98-2.*
Miller et al. 2002. Growing Chickpea in the northern Great Plains. MT200204 AG Mar. 2002.*
Oplinger et al. 1990. Chickpea (garbanzo bean) in Alternate Field Crop Manual. found at http://www.hort.purdue.edu.*
Miller et al. 2001. Using Growing Degree Days to Predict Plant Stages. MT200103 AG Jul. 2001.*
Anonymous undated. Growing Degree Days and Phenology of Ohio. found at http://www.oardc.ohio-state.edu.*
Anonymous 2003. How to Manage Pests—Degree-Days found at http://axp.ipm.ucdavis.edu.*

* cited by examiner

Primary Examiner—Jeffrey L. Gellner
(74) Attorney, Agent, or Firm—Christensen O'Connor Johnson Kindness PLLC

(57) ABSTRACT

An agronomic system is disclosed for the commercial production of green Cicer beans wherein a relative risk of caramelization is determined based on geographical data, macro climate data, and micro climate data for a given locale. Relative risk of caramelization helps select acreage to be planted. Additionally, an agronomic system and method for cultivation and commercial production of the green Cicer bean is described herein for preferred row spacing and variety selections that are usable for the commercial production of the green Cicer bean. Prior to the present invention there were no agronomic methods or systems adapted for commercial production of the green Cicer bean. The agronomic systems and methods disclosed herein also help to adjust planting times based on growing degree day calculations for given parcels wherein harvesting of the green Cicer bean is in rhythm with processing plant capacity.

15 Claims, 2 Drawing Sheets

AGRONOMIC METHOD FOR COMMERCIAL PRODUCTION OF THE GREEN CICER BEAN

FIELD OF THE INVENTION

This invention relates to agronomy generally and more specifically to methods for the commercial production of the green Cicer bean.

BACKGROUND OF THE INVENTION

Cicer beans (*Cicer arietinum*) are a high value crop adapted well for both dry land and irrigated cropping regions. Cicer beans are also known as chickpeas or hummus beans and they are an annual grain legume or "pulse crop" that originated in the Fertile Crescent of the Near East. Cicer beans were one of the first legumes cultivated by humans, dating to 7,000–6,000 B.C. Pulse crops, like Cicer beans, dry beans, dry peas, fava beans, lentils, and lupin work with rhizobia bacteria to convert nitrogen from the atmosphere into nitrogen nodules on the plant roots. This process increases soil fertility in rotation with other crops such as wheat, barley and other cereal grains. Cicer beans are classified as "Desi" or "Kabuli" types based in part on seed size, color, thickness of the seed coat, and shape of the seed coat. Desi seed-types produce smaller seeds, generally 100 or more seeds per ounce when dried. The seeds have a thick and irregular-shaped seed coat which can range in color when dried from light tan to black. Popularly referred to as "garbanzo beans," Kabuli-types produce larger seeds and have a paper thin seed coat. Kabuli-types are graded into 38 to 40 seeds per ounce. Kabuli-types produce seeds with colors that range when dried from white to a pale cafe cream colored tan.

World production of the Cicer bean is roughly three times that of lentils and peas. Among other pulse crops marketed as human food, world Cicer bean consumption is second only to dry beans. Turkey, Australia, Syria, Mexico, Argentina, and Canada are the major Cicer bean exporters around the world. About 90% of Cicer beans, the majority of which are Desi-types, are consumed in India. Historically, North American Cicer bean production was confined to California and to a lesser extent, the Pacific Northwest. Recently, Cicer bean production has expanded into the northern Great Plains regions of Canada and the United States.

Cicer bean plants are erect with primary, secondary and tertiary branching, resembling a small bush. They flower profusely and have an indeterminate growth habit, continuing to flower and set pods as long as conditions are favorable. Pod set occurs on the primary and secondary branches, and on the main stem. The individual round pods generally contain one seed in Kabuli-types and often two seeds in Desi-types. Cicer bean stems, leaves and seed pods are covered with small hair-like glandular structures that secrete malic and oxalate acids, which deter insect pests. Insect problems on Cicer beans have been minimal and insecticide applications generally have not been necessary.

Commercial Cicer bean production has heretofore been limited to dry beans, typically harvested at about 10% moisture when, for example, the Kabuli-type bean obtains a characteristic yellowish cream color. Crop loss can be high because swathing or other traditional combining techniques cut the dry Cicer bean plant at its stock and combines traditionally used for harvesting cereal crops are used to depod the product. Yield losses of up to 33% are not uncommon. Furthermore, the dry Cicer bean must undergo extensive rehydration prior to canning and freezing. Cicer beans are often damaged during dry harvesting and processing through breakage of the brittle bean's characteristic small protruding beak-like structure, causing economic loss.

In some areas of the world, green Cicer beans are harvested by hand and thereafter depodded by hand for fresh consumption. The green Cicer bean is a valuable crop both for its higher nutritional quality than that of the dry Cicer bean and its characteristic sweet taste and favorable texture. World produce markets have experienced an increased demand for organic green produce, which in turn, has increased market demand for the green Cicer bean. Until the present invention, there has been no commercially viable way to satisfy the market demand for green Cicer beans due primarily to agronomic, harvesting and processing challenges associated with green Cicer beans.

Most Cicer beans are grown in arid areas or are otherwise subject to high temperatures during green harvest time. Green Cicer beans are highly susceptible to caramelization prior to harvest and processing. Caramelization is the process by which sugars in the green Cicer beans are scorched. Caramelization of the green Cicer bean may occur at temperatures of 95° F. and higher. Scorched sugars due to caramelization of the green Cicer bean completely change the taste, color, and nutritional value of the product and renders it commercially useless as a green commodity. If the green Cicer bean is exposed to caramelization temperatures, it is only saleable as a sub-standard dried commodity. Accordingly, there exists a need for methods to avoid the problem of caramelization associated with green Cicer bean production.

Commercial production of the green Cicer bean presents numerous other challenges apart from caramelization. The green Cicer bean is maturing in the field daily and is especially susceptible to change in color, texture and flavor. Food processors and growers face a challenge to produce a marketable product that must be preserved at the peak of quality. Post-harvest handling and processing methods for the green Cicer bean should be adapted to preserve the green Cicer bean's unique shape, texture, color, and flavor.

SUMMARY OF THE INVENTION

The invention provides methods for the commercial production of green Cicer beans. In one aspect of the present invention a method comprises selecting acreage based on relative risk of caramelization for a crop of Cicer beans; planting Cicer beans in the selected acreage; monitoring growing degree days of the selected acreage after planting by calculating a daily growing degree value; and harvesting said Cicer beans when said growing degree days reach a predetermined accumulated value. Methods according to the present invention can also include harvesting Cicer beans when the predetermined accumulated value for growing degree days is between 70 and 140. Further, methods of the present invention may also determine relative risk of caramelization using geographical data, or alternatively, using micro climate data, or alternatively, using macro climate data.

The invention also provides methods for scheduling planting times of a Cicer bean crop for the commercial production of green Cicer beans. In one aspect, a method of the present invention comprises determining green Cicer bean processing capacity of a processing plant; predicting the time required for each of a plurality of green Cicer bean growing parcels to reach a predetermined growing degree day accumulated value; predicting average daily yield ready for processing using said predicted time required for each of said plurality of green Cicer bean growing parcels to reach said predetermined growing degree day accumulated value; and scheduling planting times for each of said plurality of green Cicer bean growing parcels such that said predicted average daily yield ready for processing does not substantially exceed a predetermined processing capacity. Methods of the present invention may also include determining a time in transit from a predetermined location to a processing plant and, alternatively predicting an average daily yield ready for processing that is adjusted based on time in transit to a processing plant.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
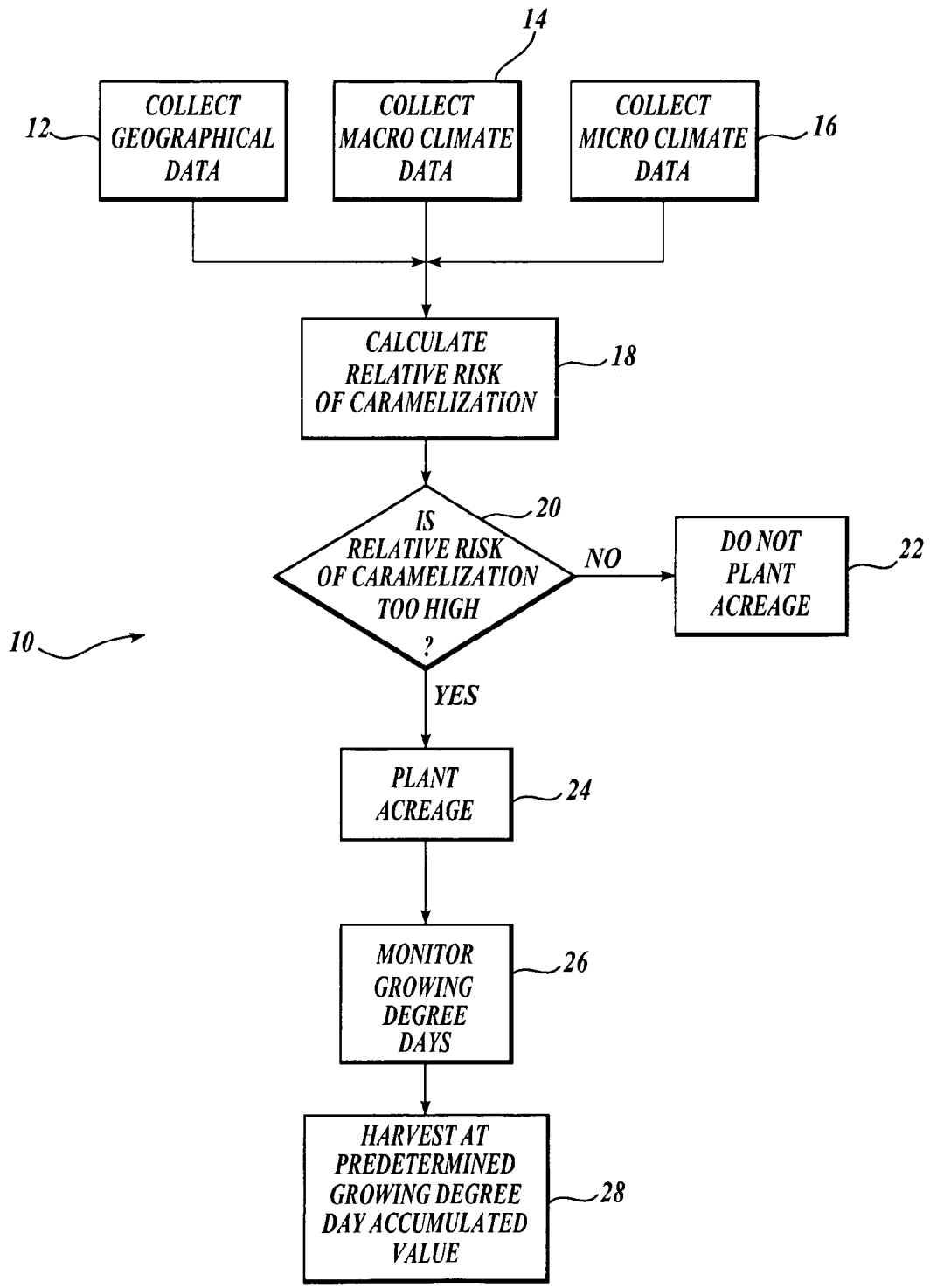
FIG. 1 is a flow diagram of a method for the commercial production of green Cicer beans and specifically disclosing a method suitable for calculating relative risk of caramelization used for selecting acreage to plant.

The invention provides methods for the commercial production of green Cicer beans. In one aspect of the present invention a method comprises selecting acreage based on relative risk of caramelization for a crop of Cicer beans; planting Cicer beans in the selected acreage; monitoring growing degree days of the selected acreage; and harvesting said Cicer beans when said growing degree days reach a predetermined accumulated value.

I. Selecting Acreage, Seed and Row Spacing

The Cicer bean prefers fertile, sandy loam soils with good internal drainage. Good drainage is necessary because even short periods of flooded or water-logged fields reduce growth and increase the susceptibility to root and stem rot.

The green Cicer bean is a cool season annual crop performing optimally in 70–80° F. day time temperatures and 64–70° F. night temperatures. This plant produces good yields in dryer conditions because of a deep tap root system. Heavier rainfall seasons (i.e., over 30 inches annually) show reduced yields due to disease outbreaks, stem lodging, and other problems related to excessive vegetative growth. Areas with lighter, well-distributed rainfall patterns have produced the highest yield of Cicer beans which prior to the present invention, have never been commercially produced as a green commodity.

A good quality seed should be selected. The seed should desirably be high in germination percentage (over 85%), blight free, damage free, and free of weed seeds. It is desirable for seed to be treated adequately with apron and moly as well as lindane and maxim. Any history of problems with Pythium or Rhizoctonia rots in the field may need to be treated prior to planting.

A multitude of varieties of Cicer bean seed are suitable for use with the invention as shown and described herein. More modern varieties have greater resistance to blight (*Aschochita rabiai*), and these varieties are available from the USDA Agricultural Research Service from various locations, such as Washington State University in Pullman, Wash. Exemplary seed varieties demonstrating good attributes for use with the present invention and an ability to be resistant to blight are the Evans, Sanford, Dwelley, and Sierra, among the Kabuli-types. Other Kabuli varieties available from the University of California in Davis, California, include UC-5 and UC-27. There are also a myriad of Desi-type varieties that are usable with the present invention. Some suitable Desi-types include B-90, Ammet, and Broneck SP7.

Regarding seed bed preparation, a firm smooth seed bed with most of the previous crop residue incorporated is preferred. This will allow proper depth of planting as well as good seed to soil contact, which helps to aid good germination and emergence of the green Cicer bean. If moisture is short, a deep irrigation is recommended. A deep tillage may also be used to maintain a minimum amount of two or three inches of top soil which will help minimize excessive drying.

Regarding seeding date, methods, and rate of seeding, the green Cicer is a cool season species and is frost tolerant as a seedling. Seeds should be planted in spring, however, soil temperatures of 50° F. to 60° F. are desirable. Later planting dates may result in shorter plants, less yield and later maturity due to late-formed flowers and pods. Flowers and pod abortion rates increase if flowering and pod set coincide with the hottest and driest weather patterns. Green Cicer beans can be planted at a variety of row spacings which are preferred for practicing the invention as shown and described herein. Depending on whether the acreage selected is dry land or irrigated, the row spacing will vary.

Preferable row spacing identified as suitable for practicing methods as shown and described herein include spacings between 4 and 48 inches for Kabuli varieties planted in dry land with a preferred row spacing between 10 and 14 inches. For Kabuli-types planted in irrigated farm land, the maximum range for row spacing is between 4 and 48 inches with a preferred range between 34 and 38 inches. Regarding Desi-types, the maximum row spacing for dry land farming is between 4 and 48 inches with a preferred range between 4 and 8 inches. Regarding the planting of Desi-types in irrigated farm land, the preferred maximum row spacing is between 4 and 48 inches with a preferred range between 16 and 20 inches. The disclosed row spacings accomplish many advantages including "hiding" the Cicer bean plant from weeds and other damaging pests which may be present in irrigated land or otherwise encouraged through the use of fertilizers which heretofore have not been applied to the Cicer bean to maintain a green character during harvest.

The row spacings described herein also provide growers with the ability to control yields and to further adjust the amount of product produced during harvest in an effort to predict yield and time harvesting in rhythm with processing plant capabilities. As previously mentioned, predicting yields and managing maturity of the crop helps commercial production of the green Cicer bean by avoiding crop loss due to caramelization after harvest but prior to processing. Additionally, stockpiling at the processing plant due to out-of-sync harvest timing or over-production as a result of row spacing may lead to spoilage of the green product.

Seeds should be planted one inch, to two inches deep, using a drill or planter which can deliver the Cicer seed with a minimum amount of damage. Good seed-to-soil contact should also be ensured with a press wheel if possible.

Regarding weed control, various mechanical and chemical means can be used in accordance with methods of the invention. For example, the Cicer bean is not very competitive with weeds, so it should be planted in fields which have few if any major weed problems, especially perennial weeds such as quack grass or thistle. Rotary hoeing and/or field cultivation in wider row spacings can be used as necessary to control weed populations. Early weed competition is more damaging to yield than later emerging weeds so it may be preferable to avoid extensive damage to plants and to cultivate when the leaves and stems are drier to reduce spreading of disease organisms. Various chemical means of controlling weeds are also available including the herbicide metholachlor (Dual and Pursuit). This herbicide can be applied as a pre-plant or as a pre-emergence treatment. The herbicide metholachlor gives excellent annual grass control and fair-to-good annual broadleaf control. A rotary hoe could be used in green Cicer production in the same manner as with the soybean. Rotary cultivation is not particularly appropriate, however, due to the potentially narrow row spacing as previously discussed. If annual grasses or quack grass are abundant after the crop emerges, a post-emergence application of sethoxydim, Select, or Assure II (Poast) may be considered. Application rate will naturally vary, based on weed species. When Poast is applied, it should be done with at least one quart per acre of Dash or a crop oil concentrate.

In addition to acreage, seed, and row spacing, a method of the invention selects acreage based on a relative risk of caramelization.

II. Relative Risk of Caramelization

Referring now to FIG. 1, this figure depicts a method 10 for the commercial production of the green Cicer bean. As stated previously, commercial production of the green Cicer bean is especially limited by risks that the product will caramelize, i.e., convert sugars in the green Cicer bean into starch, thereby making the product useless as a green commodity. One embodiment of the present invention depicted by FIG. 1 shows a method that helps select acreage for planting by identifying crop parcels with a reduced risk of caramelization.

According to method 10, relative risk of caramelization is used to select acreage for planting. Geographical data 12, macro climate data 14, and micro climate data 16 are considered when calculating a relative risk of caramelization 18. Geographical data 12 for a crop of green Cicer beans includes the crop's location in degrees latitude and longitude, or alternatively in decimal degrees. The inventors have determined that 45° north latitude or −45° south latitude provide ideal geographical locations for commercially producing the green Cicer bean. These latitudes provide a geographical location contributing to a relatively low risk of caramelization due to historical temperature data. According to method 10, geographical data 12 of a given parcel for the production of green Cicer beans will be less favorable, i.e., contribute to a higher risk of caramelization, when the acreage is located away from 45° north latitude or −45° south latitude and towards the Equator. In other words, as geographical location for a given parcel is located closer to the Equator, the risk of caramelization increases. Naturally, risks other than caramelization such as harmful freezing at inappropriate times can also damage a crop of green Cicer beans. These risks (i.e., freezing) are not depicted by FIG. 1, but they are nevertheless important for green Cicer bean production. Risks associated with freezing at inappropriate times for commercial production of the green Cicer bean will tend to increase as acreage is located north of 45° north latitude or south of −45° south latitude.

With continuing reference to FIG. 1, macro climate data 14 is collected for a given crop of green Cicer beans. Macro climate data 14 may include historical temperature information for a given locale such as that available based on global ocean surface temperatures. Further, predicted macro climate published by the United States Navy and the United States Department of Defense based on global ocean surface temperatures may be used as interpreted by Dr. Arthur Douglas of Creighton University in Omaha, Nebr. Macro climate data 14 can be used to calculate relative risk of caramelization 18 for example by identifying acreage having historically higher temperatures, and consequently a tendency to increase the relative risk of caramelization. Furthermore, macro climate data 14 for example is based on global ocean surface temperatures can help predict changes in historical climate that may lower a given parcel's relative risk of caramelization or alternatively increase a given parcel's relative risk of caramelization.

Micro climate data 16 may also be collected and used for calculating a relative risk of caramelization 18. Micro climate data for example, considers slope, aspect, and elevation. Micro climate factors that may increase the relative risk of caramelization on a parcel-specific basis may include elevations lower than 3500 feet which, depending on geographical data 12, have a tendency to subject the Cicer crop to temperatures that may increase the risk of caramelization. Additionally, a south-facing slope located in the northern hemisphere and receiving continued exposure to direct sunlight may increase the relative risk of caramelization. Micro climate data 16 having a tendency to decrease the relative risk of caramelization for a given parcel may include elevations between 1,500 and 3,000 feet, depending again on geographical data 12, and whether these elevations within this location have a tendency to subject the Cicer crop to temperatures that may decrease the relative risk of caramelization.

With continuing reference to FIG. 1, meted 10 calculates relative risk of caramelization using micro climate data 16, macro climate data 14, and geographical data 12. The collected data is used to calculate relative risk of caramelization according to the following equation:

$$\frac{X + Y + Z}{3} = RRC \qquad (1)$$

The geographical data 12 for a given parcel will be assigned the algebraic identifier X and be at a value between 1 and 10 where a value of 1 is used to indicate parcels located nearest to 45° latitude north or −45° latitude south, and a value of 10 is used to indicate acreage located at the Equator. Naturally, acreage located at the Equator will tend to increase the relative risk of caramelization because temperatures of 95° F. and higher are more prevalent. Conversely, acreage located at 45° latitude north and −45° latitude south have been identified by the inventors as geographical locations around which ideal acreage for propagation of the green Cicer bean exists due to the occurrence of fewer days with consistent temperatures of 95° F. and higher.

Equation No. 1 assigns the algebraic identifier Y for micro climate data 16. Micro climate data 16 is also assigned a value between 1 and 10 wherein acreage having the most favorable micro climate data 16 is given a value of 1 and wherein acreage having the least favorable micro climate data 16 is given the value of 10. Finally, according to Equation 1, macro climate data 16 is assigned the algebraic identifier of Z and it is also given a value between 1 and 10, wherein the value of 1 is assigned for acreage having the most favorable macro climate data and wherein a value of 10 is assigned for acreage having the least favorable macro climate data. If a given crop parcel obtains the lowest possible numerical values for geographical data 12, micro climate data 16, and macro climate data 14, it will receive an RRC value of 1 which will be the lowest relative risk of caramelization.

$$\left(\frac{1+1+1}{3}=1\right)$$

Conversely, if a given crop parcel obtains the highest possible numerical values for geographical data 12, micro climate data 16, and macro climate data 14, it will receive an RRC value of 10, which will indicate the highest relative risk of caramelization.

$$\left(\frac{10+10+10}{3}=10\right)$$

In accordance with method 10, if the RRC value is less than or equal to 5, the given acreage is planted 24. Conversely, according to method 10, if the RRC value is greater than 5, the acreage will not be planted 22. If the acreage is selected for planting 24, "growing degree days" (discussed below) for the acreage will be monitored 26 and the crop will be harvested when the acreage reaches a predetermined growing degree day accumulated value 28. Growing degree days are discussed in the following section, but in general, growing degree days (also known as "heat units") measure the amount of heat absorbed by a crop of Cicer beans over time. Maturity of the green Cicer bean is determined based on an accumulated growing degree day value and the inventors have observed preferred maturity levels based on growing degree day accumulated value as discussed further below.

One of skill in the art will recognize that a variety of scales may be used in accordance with the described method and that the invention is not limited to a scale of 1 to 10 measuring geographical data 12, micro climate data 16, and macro climate data 14. Further, the decision to plant at an RRC value of equal to or less than 5 (or 50, or 500, etc.) can also be varied according to a desired risk level. Further, RRC may be calculated by a central processing unit that can optionally be in communication with a number of databases for collecting and processing geographical data 12, micro climate data 16, and macro climate data 14.

III. Harvesting Green Cicer Beans Based on Accumulated Growing Degree Days

Because crop development is dependent on temperature over a period of time, thermal time or "growing degree days" can be calculated cumulatively over time. Growing degree days are also commonly referred to as "heat units." The calculation method most commonly used in the United States for determining growing degree days is the formula suggested by the National Oceanic and Atmospheric Administration ("NOAA"). The NOAA method calculates growing degree days ("GDD") as the average daily temperature ("ADT") minus fifty.

$$GDD=ADT-50 \qquad (2)$$

Equation No. 2 finds the GDD for a given parcel by taking an average of the daily temperature ("ADT") and subtracting fifty. GDD is recorded daily from the first day of planting. GDD is then accumulated and monitored until a desired accumulated GDD is reached. Equation No. 2 may be modified to incorporate limits imposed on the daily maximum and minimum temperatures allowed in the calculation. Daily maximum temperatures greater than 86° F. can optionally be set to equal eighty-six in the calculation of ADT. Similarly, daily minimums less than 50° F. can be set to equal fifty in the calculation. This modified calculation is referred to as the "modified growing degree day formula."

Using the modified growing degree day formula, the inventors have observed a preferred level of green Cicer bean maturity is present when the growing degree day accumulated value is between 70 and 110. Further, the inventors have observed that another preferred level of green Cicer bean maturity equates to an accumulated growing degree value between the values of 90 and 110. The amount of time required to reach the preferred level of maturity in growing degree days will vary depending on the acreage selected for planting. For example, acreage having relatively low daily temperatures will take longer to reach the desired maturity level in accumulated growing degree days. Conversely, acreage selected for planting in hotter regions will reach a desired maturity level more rapidly in terms of accumulated growing degree days.

IV. Methods for Timing a Harvest in Rhythm with Processing Capacity

Figure 2:
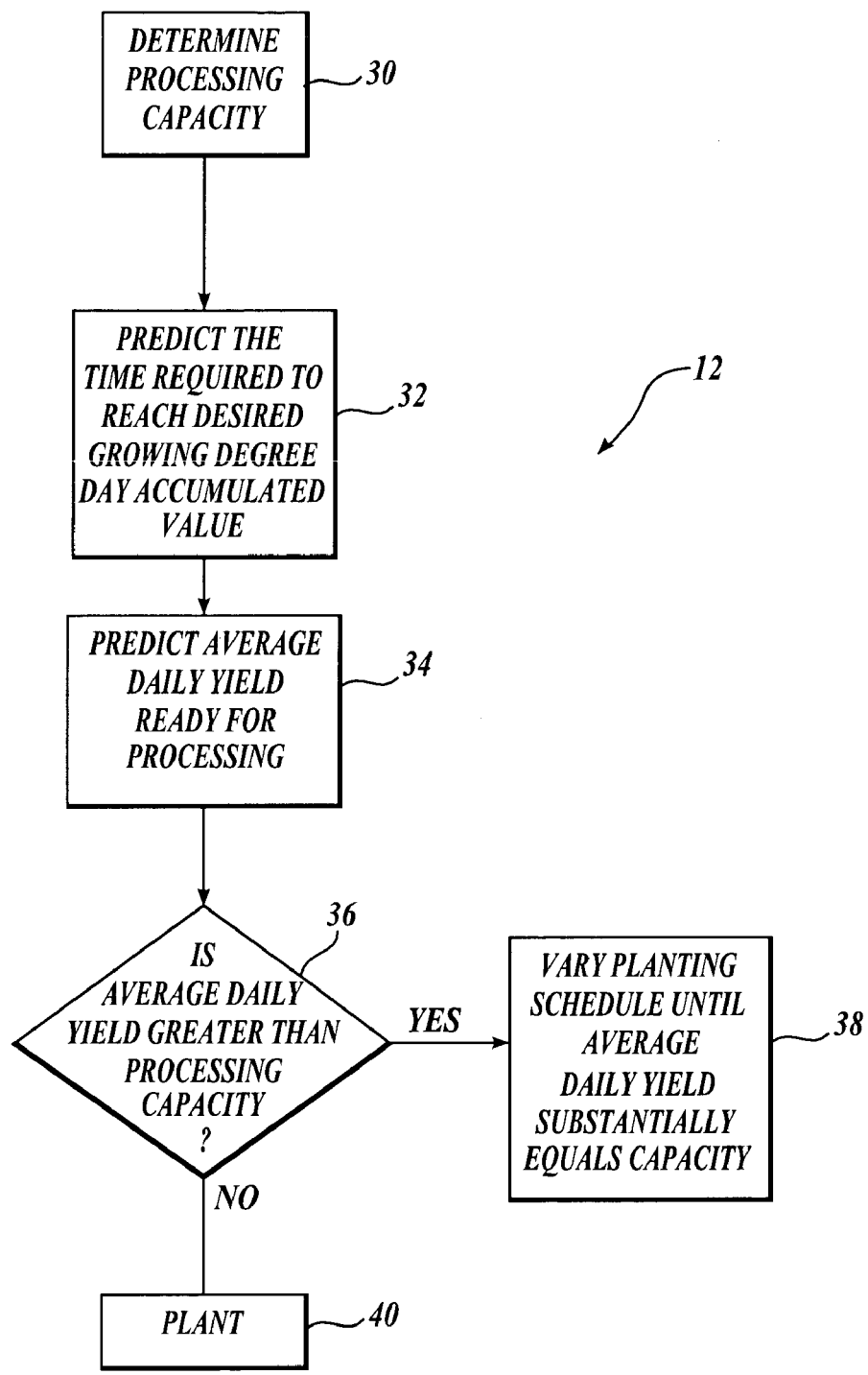
FIG. 2 is a flow diagram disclosing a method for the commercial production of green Cicer beans showing steps for predicting average daily yields of a green Cicer bean crop.

With reference now to FIG. 2, a method 12 for the commercial production of green Cicer beans is depicted by a flow diagram. Method 12 includes a step of determining a processing capacity 30. A processing capacity determination can be made based on a plurality of processing plants, or, alternatively, one processing plant. Processing plant capacity among one or a plurality of processing plants must be determined for those plants located within a manageable distance from the point of harvest, wherein green Cicer beans can be transported after harvest in refrigerated trucks or otherwise kept cool such that the risk of spoilage is minimized. According to method 12, once a processing capacity is determined 30, the time required to reach desired maturity in terms of accumulated growing degree days is predicted 32. Based on the predicted time required to reach a desired growing degree day accumulated value 32, the average daily yield ready for processing 34 for a given allotment of Cicer acreage is predicted. According to method 12, a yield is "ready for processing" when it is delivered to a processing plant. Once the average daily yield ready for processing is predicted 34, according to method 12, a decision 36 must be made regarding whether the predicted average daily yield ready for processing 34 is greater than processing capacity 30. If the predicted average daily yield ready for processing 34 is greater than or less than processing capacity 30, a planting schedule must be created 38 that will alternate planting locations or times such that the average daily yield ready for processing 34 is substantially equal to processing capacity 30.

For example, method 12 may determine that processing capacity for a given processing plant is 10,000 lbs. of green Cicer beans per day. With this processing capacity in mind, a grower will predict the time required for separate parcels to reach the desired green Cicer bean maturity in terms of accumulated growing degree day value 32. If, for example, the grower has seven separate parcels for the production of green Cicer beans, and each parcel is predicted to yield 10,000 lbs. of harvested green Cicer beans, the grower will predict the time required for each of the seven parcels to reach a predetermined maturity based on growing degree day accumulated value 32. In this example, if the grower's seven parcels are predicted to take the same amount of time to reach a preferred maturity based on growing degree day accumulated value, then the predicted average daily yield ready for processing 34 (assuming all seven parcels can be harvested in one day and delivered to a processing plant in one day) will be 70,000 lbs. Accordingly, in this example, the predicted average daily yield ready for processing 34 is greater than the processing capacity 30. Thus, the grower must vary planting times 38 such that the predicted average daily yield ready for processing 34 is substantially equal to processing capacity 30. A grower may wish to stagger planting times for the seven parcels such that they may be harvested and be ready for processing at a yield that is substantially equal to processing plant capabilities.

In yet another example, if the grower's seven parcels have varying times at which they will respectively reach a level of maturity in terms of growing degree day accumulated value, then the grower must ascertain how much yield will be ready for harvest according to a predetermined desired growing degree day accumulated value 32. The grower may select acreage that will reach an accumulated growing degree day value faster and plant all parcels at the same time because an adequate amount may be ready for harvest in rhythm with processing plant capacities. In general, the grower will need to ascertain on a parcel-specific basis, the time required to reach ideal maturity in terms of growing degree day accumulated value 32 and predict an average daily yield ready for processing 34. Depending on the variation in time among parcels for a stand to reach maturity, the grower will either vary planting times to keep average daily yield in rhythm with processing capacity or the grower will vary acreage selected, planting earlier-maturing acreage, mid-maturing acreage, and late-maturing acreage in amounts substantially balanced with processing capacity.

Other factors that may be considered, when a given planting schedule is created, are the time in transit to a plurality of processing plants. Time in transit to a processing plant can influence the predicted average daily yield ready for processing 34 because this value is limited by a grower's ability to deliver an amount of product to a processing plant. Accordingly, the predicted average daily yield ready for processing 34 for a given crop of green Cicer beans may be adjusted based on time in transit. If it is not possible to transport all harvested crop in a single day to a given processing plant, then the predicted average daily yield must be adjusted to accommodate transportation times.

V. Fertility Requirements for the Commercial Production of the Green Cicer Bean

Fertility requirements for commercial production of the green Cicer bean may require base amounts of phosphorous (phosphates), sulfur, potassium, nitrogen, potash, boron, and any other micronutrients recommended generally for growing pulse crops by given locale. Fertilizer application may be based on soil tests and previous crop expected yield level. The soil may be limited to a pH of 6 unless a crop with a higher pH requirement is grown in the rotation. Phosphate and potash recommendations usable with the present invention are between 10 and 50 pounds/acre applied once per growing season or as needed to maintain a green character of the crop for a slightly delayed harvesting beyond the preferred range of accumulated growing degree day value as discussed above. The inventors have observed that an application between 25 and 35 pounds/acre is preferable. Banding applications may be preferable over broadcast applications, wherein 90% of the necessary nutrients may be applied pre-plant up to five inches in depth, and the remaining 10% applied at blooming season generally in micronutrient form. Seed fertilizers also may show benefits in fertility.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for the commercial production of green Cicer beans, wherein the method comprises:
   selecting acreage based on a low risk of caramelization for a crop of Cicer beans;
   planting Cicer beans in the selected acreage;
   monitoring growing degree days of the selected acreage after planting by calculating a daily growing degree value; and
   harvesting said Cicer beans when said growing degree days reach an accumulated value between 70 and 110;
   wherein substantially all of the harvested Cicer beans are green Cicer beans.

2. The method of claim 1, wherein said daily growing degree value is calculated by subtracting fifty from an average of a series of daily temperature values, wherein said daily growing degree value is modified to equal zero when said average is less than or equal to fifty, and wherein said daily growing degree value is further modified to equal thirty-six when said average is greater than or equal to eighty-six.

3. The method of claim 1, wherein said relative risk of caramelization is determined using geographical data.

4. The method of claim 3, wherein said geographical data includes distance of a parcel of Cicer beans away from 45° latitude north or south.

5. The method of claim 1, wherein said relative risk of caramelization is determined using micro climate data.

6. The method of claim 5, wherein said micro climate data comprises slope, aspect, and elevation.

7. The method of claim 1, wherein said relative risk of caramelization is determined using macro climate data.

8. The method of claim 7, wherein said macro climate data comprises historical climate information and predictions using global ocean surface temperatures.

9. The method of claim 1, further comprising the step of applying a fertilizer to said Cicer beans to maintain a green color.

10. The method of claim 9, wherein said fertilizer has a base composition of phosphate, nitrogen, sulfur, or potash.

11. The method of claim 1, further comprising selecting a Cicer variety that produces an upright plant, suitable for mechanical harvesting.

12. The method of claim 1, wherein said Cicer beans are Kabuli-types, grown in dry land acreage, and said Cicer beans are planted in a multiplicity of rows wherein each row is spaced between 4 and 48 inches from the nearest adjacent row.

13. The method of claim 1, wherein said Cicer beans are Kabuli-types, grown in irrigated acreage, and said Cicer beans are planted in a multiplicity of rows wherein each row is spaced between 4 and 48 inches from the nearest adjacent row.

14. The method of claim 1, wherein said Cicer beans are Desi-types, grown in dry land acreage, and said Cicer beans are planted in a multiplicity of rows wherein each row is spaced between 4 and 48 inches from the nearest adjacent row.

15. The method of claim 1, wherein said Cicer beans are Desi-types, grown in irrigated acreage, and said Cicer beans are planted in a multiplicity of rows wherein each row is spaced between 4 and 48 inches from the nearest adjacent row.

\* \* \* \* \*